(12) United States Patent
Kreuter et al.

(10) Patent No.: US 11,006,507 B2
(45) Date of Patent: May 11, 2021

(54) LIGHT-EMITTING DIODE DRIVER, LIGHT-EMITTING DIODE MODULE AND CORRESPONDING SYSTEM

(71) Applicant: Infineon Technologies AG, Neubiberg (DE)

(72) Inventors: Hans-Peter Kreuter, Villach (AT); Maurizio Galvano, Padua (IT); Andrea Logiudice, Montegrotto Terme (IT); Franco Mignoli, Verona (IT); Andrea Scenini, Montegrotto Terme (IT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/414,934

(22) Filed: May 17, 2019

(65) Prior Publication Data
US 2019/0353336 A1 Nov. 21, 2019

(30) Foreign Application Priority Data
May 18, 2018 (DE) .......................... 102018111976.3

(51) Int. Cl.
*H05B 47/18* (2020.01)
*H05B 45/00* (2020.01)
*F21V 23/00* (2015.01)
*F21V 23/02* (2006.01)

(52) U.S. Cl.
CPC ............ *H05B 47/18* (2020.01); *F21V 23/004* (2013.01); *F21V 23/023* (2013.01); *H05B 45/00* (2020.01)

(58) Field of Classification Search
None
See application file for complete search history.

(56) References Cited

U.S. PATENT DOCUMENTS

| 4,792,731 A | 12/1988 | Pearlman et al. |
| 5,959,413 A | 9/1999 | Komarek et al. |
| 2009/0021955 A1* | 1/2009 | Kuang ................... H05B 45/10 362/479 |
| 2019/0132929 A1* | 5/2019 | Sturm .................... H05B 47/18 |

FOREIGN PATENT DOCUMENTS

| JP | 2002108286 A | 4/2002 |
| JP | 2002190848 A | 7/2002 |
| JP | 2004145321 A | 5/2004 |
| JP | 2006030949 A | 2/2006 |
| JP | 2008044148 A | 2/2008 |
| JP | 2013527482 A | 6/2013 |
| JP | 2014011794 A | 1/2014 |

(Continued)

*Primary Examiner* — Dedei K Hammond
(74) *Attorney, Agent, or Firm* — Slater Matsil, LLP

(57) ABSTRACT

According to one exemplary embodiment, a light-emitting diode driver is provided, having: a differential first interface, a single-ended second interface, wherein the light-emitting diode driver is configured to use the first interface to communicate according to a bidirectional differential bus communication protocol as a slave, to use the second interface to communicate according to a single-ended bus protocol and to transpose signals between the first interface and the second interface, and to supply one or more light-emitting diodes with electric power on the basis of signals received via the first interface.

21 Claims, 8 Drawing Sheets

(56) References Cited

FOREIGN PATENT DOCUMENTS

| | | | |
|---|---|---|---|
| JP | 2016095629 | A | 5/2016 |
| JP | 2016157414 | A | 9/2016 |
| JP | 2018064165 | A | 4/2018 |
| JP | 2019528586 | A1 | 10/2019 |
| WO | 2011056242 | A1 | 5/2011 |
| WO | 2017162324 | A1 | 9/2017 |
| WO | 2018001762 | A1 | 1/2018 |

* cited by examiner

LIGHT-EMITTING DIODE DRIVER, LIGHT-EMITTING DIODE MODULE AND CORRESPONDING SYSTEM

This application claims the benefit of German Application No. 102018111976.3, filed on May 18, 2018, which application is hereby incorporated herein by reference in its entirety.

TECHNICAL FIELD

The present application relates to light-emitting diode drivers, light-emitting diode modules and corresponding systems.

BACKGROUND

Light-emitting diodes are increasingly used for a wide variety of lighting tasks. By way of example, in vehicles, light-emitting diodes are replacing conventional light bulbs or halogen lamps in headlamps, tail lights, turn signals or in interior lighting. In buildings engineering too, light-emitting diodes are increasingly replacing other illuminants such as light bulbs or halogen lamps.

In some cases, this involves a large number of light-emitting diodes being used that can be actuated individually or in groups. This allows light effects such as for example seemingly chasing lights to be attained.

Such light-emitting diodes are frequently provided as light-emitting diode modules, for which a multiplicity of individual light-emitting diodes is provided for example on a printed circuit board (PCB) or another support. The actuation in this case is provided by means of a control unit, frequently referred to as an ECU (electronic control unit). The light-emitting diode modules in this case contain not only the light-emitting diodes but also further components, such as current-limiting components (resistors, transistors and the like), light-emitting diode driver circuits such as e.g. linear current sources having protective and diagnostic circuits, and/or interfaces or microcontrollers for additional functions.

In many cases, individual connections run from such an ECU to the different groups of light-emitting diodes or driver circuits associated with the groups. Such solutions require relatively complex wiring, and diagnosis options are frequently limited.

Another approach involves a LIN (Local Interconnect Network) bus being used for actuation. In the case of a LIN (Local Interconnect Network) bus, the data rates may be inadequate in some cases.

SUMMARY

According to one exemplary embodiment, a light-emitting diode driver is provided, having: a differential first interface, a single-ended second interface, wherein the light-emitting diode driver is configured to use the first interface to communicate according to a bidirectional differential bus communication protocol as a slave, to use the second interface to communicate according to a single-ended bus protocol and to transpose signals between the first interface and the second interface, and to supply one or more light-emitting diodes with electric power on the basis of signals received via the first interface.

According to a further exemplary embodiment, a light-emitting diode driver is provided, having: at least one single-ended interface, wherein the light-emitting diode driver is configured to use the at least one single-ended interface to communicate according to a single-ended bus protocol, wherein the light-emitting diode driver has an address, wherein the light-emitting diode driver is configured to supply the one or more light-emitting diodes with electric power on the basis of signals received via the at least one interface that comprise the address of the light-emitting diode driver.

According to a further exemplary embodiment, a light-emitting diode module is provided, having: a first light-emitting diode driver, having: a differential first interface, a single-ended second interface, wherein the light-emitting diode driver is configured to use the first interface to communicate according to a bidirectional differential bus communication protocol as a slave, to use the second interface to communicate according to a single-ended bus protocol and to transpose signals between the first interface and the second interface, and to supply one or more light-emitting diodes with electric power on the basis of signals received via the first interface, a first group of light-emitting diodes, which is associated with the first light-emitting diode driver for supplying electric power, at least one second light-emitting diode driver, having: at least one single-ended interface, wherein the light-emitting diode driver is configured to use the at least one single-ended interface to communicate according to a single-ended bus protocol, wherein the light-emitting diode driver has an address, wherein the light-emitting diode driver is configured to supply the one or more light-emitting diodes with electric power on the basis of signals received via the at least one interface that comprise the address of the light-emitting diode driver, at least one second group of light-emitting diodes, wherein each of the at least one second group of light-emitting diodes is associated with a second light-emitting diode driver of the at least one second light-emitting diode driver for supplying electric power, and a single-ended bus system connected to the second interface of the first light-emitting diode driver and to the respective at least one single-ended interface of the at least one second light-emitting diode driver.

According to a further exemplary embodiment, a light-emitting diode module is provided, having: a first circuit, having: a differential first interface, a single-ended second interface, wherein the first circuit is configured to use the first interface to communicate according to a bidirectional differential bus communication protocol as a slave, to use the second interface to communicate according to a single-ended bus protocol and to transpose signals between the first interface and the second interface, at least one second light-emitting diode driver, having: at least one single-ended interface, wherein the light-emitting diode driver is configured to use the at least one single-ended interface to communicate according to a single-ended bus protocol, wherein the light-emitting diode driver has an address, wherein the light-emitting diode driver is configured to supply the one or more light-emitting diodes with electric power on the basis of signals received via the at least one interface that comprise the address of the light-emitting diode driver, at least one second group of light-emitting diodes, wherein each of the at least one second group of light-emitting diodes is associated with a second light-emitting diode driver of the at least one second light-emitting diode driver for supplying electric power, and a single-ended bus system connected to the second interface of the first light-emitting diode driver and to the respective at least one single-ended interface of the at least one second light-emitting diode driver.

According to a further exemplary embodiment, a light-emitting diode driver is provided, having: at least one differential interface, wherein the light-emitting diode driver is configured to use the at least one differential interface to communicate according to a bidirectional differential protocol as a slave, wherein the light-emitting diode driver has an address, wherein the light-emitting diode driver is configured to supply the one or more light-emitting diodes with electric power on the basis of signals received via the at least one interface that comprise the address of the light-emitting diode driver.

A light-emitting diode module, having: a multiplicity of light-emitting diode drivers, having: at least one differential interface, wherein the light-emitting diode driver is configured to use the at least one differential interface to communicate according to a bidirectional differential bus protocol as a slave, wherein the light-emitting diode driver has an address, wherein the light-emitting diode driver is configured to supply the one or more light-emitting diodes with electric power on the basis of signals received via the at least one interface that comprise the address of the light-emitting diode driver, a multiplicity of groups of light-emitting diodes, wherein each of the multiplicity of groups of light-emitting diodes is associated with a light-emitting diode driver of the multiplicity of light-emitting diode drivers for supply with electric power, and a differential bus system connected to the respective at least one differential interface of the light-emitting diode drivers.

The above summary provides just a brief overview of some exemplary embodiments and is not intended to be interpreted as limiting. In particular, further exemplary embodiments can have features other than those described above.

DETAILED DESCRIPTION OF ILLUSTRATIVE EMBODIMENTS

Various exemplary embodiments are explained in detail below. This description of exemplary embodiments is not intended to be interpreted as limiting and serves only for illustration. In particular, other exemplary embodiments may have fewer features than the features explicitly depicted and described, and/or alternative features. Additional features, in particular features used in conventional light-emitting diode drivers and light-emitting diode modules, can also be provided.

In the figures, identical or mutually corresponding components bear the same reference signs and are not described repeatedly. Variations and variants described for one of the exemplary embodiments, in particular in regard to one or more components thereof, are also applicable to other exemplary embodiments, in particular to the components that correspond therein.

Figure 1:
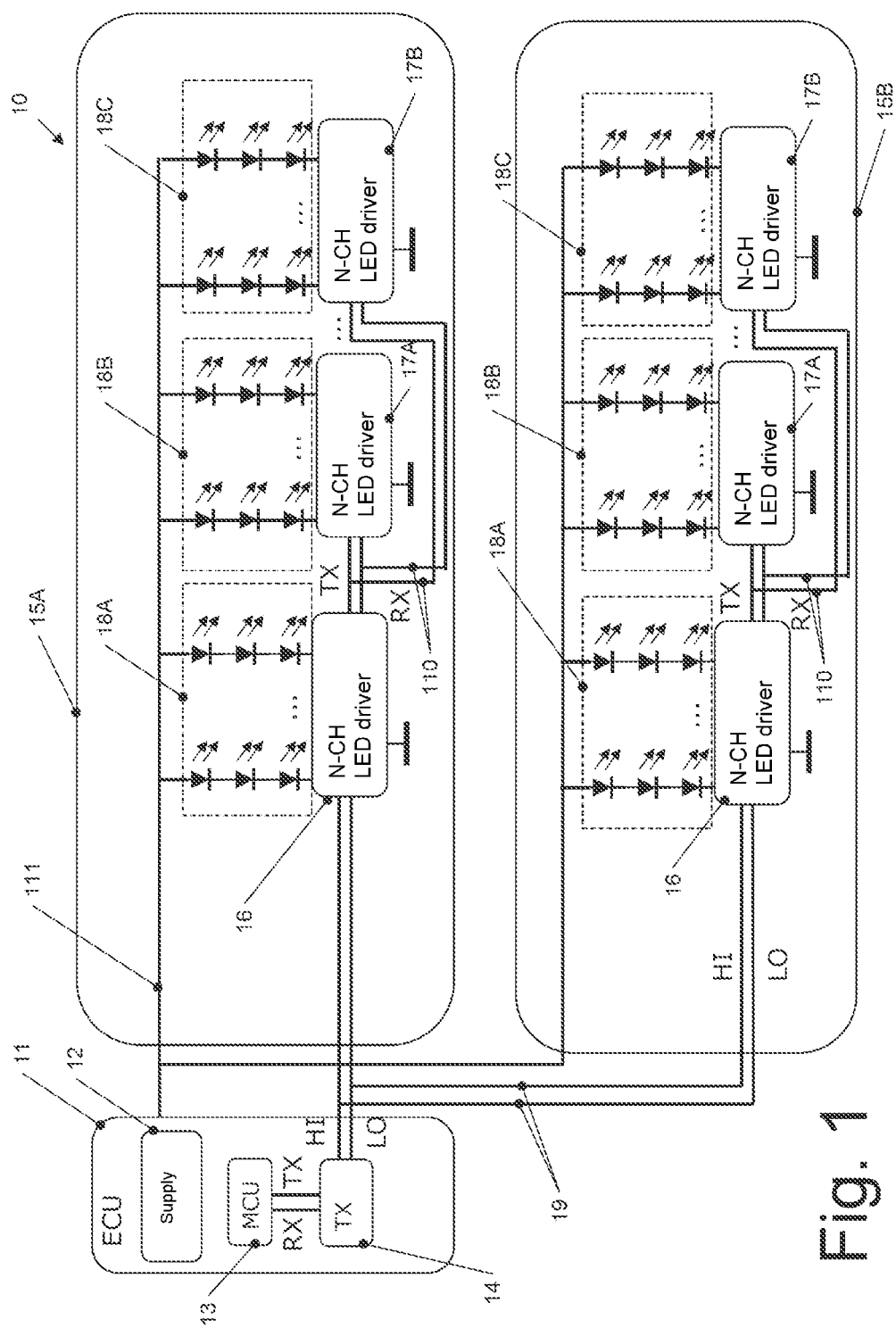
FIG. 1 is a block diagram of a system according to one exemplary embodiment.

FIG. 1 shows a system 10 according to one exemplary embodiment. The system 10 has a control unit 11 and one or more light-emitting diode modules, two light-emitting diode modules 15A, 15B (denoted succinctly as light-emitting diode modules 15) in the depicted example. The depicted number of two light-emitting diode modules 15 is intended to be understood only as an example in this case, and it is also possible for just one light-emitting diode module 15 or for more than two light-emitting diode modules 15 to be provided.

The control unit 11 in this case is an electronic control unit (ECU) and may be for example a control unit in a motor vehicle in the case of automotive applications and a control unit in the building in the case of building applications. The use of the system 10 of FIG. 1 is not restricted to automobiles and buildings, however.

The control unit 11 has a supply circuit 12 configured to provide a supply voltage for the light-emitting diode modules 15 on a supply line in from an external power supply (for example powered by a car battery or by an electricity grid in a house). In other exemplary embodiments, the supply line 111 can also be powered by a device external to the control unit 11. To this end, the supply circuit 12 can comprise in particular conventional voltage transformers such as AC/DC converters and DC/DC converters, in order to provide a desired supply voltage on the supply line in.

The control unit 11 further has a microcontrol unit 13 and a transceiver 14. Running on the microcontrol unit 13 (MCU) are in particular application programs by means of which the light-emitting diode modules 15 are controlled. The type of application programs is dependent on the respective application in this case. By way of example, the application programs can cause operation of switches (turn indicators, light switches and the like) to be taken as a basis for actuating the light-emitting diode modules 15 in order to switch applicable light functions on and off.

Finally, the control unit 11 comprises a transceiver 14 in order to interchange data with the light-emitting diode modules 15 via a differential bus 19. The use of the differential bus 19 allows communication with light-emitting diode modules 15 with comparatively little wiring complexity. As a result of the bus 19 being a differential bus, it is possible in some exemplary embodiments for a greater degree of immunity to electromagnetic interference to be achieved than in the case of a single-ended bus.

In the system 10 of FIG. 1, the control unit 11 is the master on the bus 19, and the light-emitting diode modules 15 are slaves on the bus 19. In the depicted exemplary embodiment of the system 10, it is thus possible for a bus protocol to be used that sets out from a single master (in this case the control unit 11). In such exemplary embodiments, it is thus possible to dispense with arbitration between multiple masters. In other exemplary embodiments, there may also be multiple masters present, for example in the form of multiple control units, which actuate the light-emitting diode modules, the light-emitting diode modules 15 being able to be slaves in such exemplary embodiments too.

This is in contrast to the CAN (Controller Area Network) protocol, for example, which always provides for arbitration on the data link layer (layer 2 of the OSI model), since in this case any bus subscriber can be a master, and is thus more complex to implement.

In some exemplary embodiments, however, the physical layer (layer 1 of the OSI model) can correspond to the physical layer of the CAN protocol, as defined for example in ISO 11898-1: 2003, ISO 11898-2: 2003, ISO 11898-3: 2006 and ISO 11898-5: 2007 for various implementations of the CAN standard. This means that the actual driver circuits and the signal levels used can correspond to those of the CAN bus. This has the advantage that for example the transceiver 14 used for the control unit 11 and the applicable transceivers used on the light-emitting diode modules 15 can be conventional CAN transceivers, as described later on, that are then actuated only according to a modified protocol (for example without arbitration and/or with simplified signaling).

The communication by the differential bus 19 in this case can be half-duplex communication in the depicted exemplary embodiment, i.e. either a data transmission from the control unit 11 to one of the light-emitting diode modules 15A, 15B or from one of the light-emitting diode modules 15A, 15B to the control unit 11 takes place on the differential bus 19 at one particular time, the respective other light-emitting diode module 15A, 15B "eavesdropping" on the bus as it were. To this end, the control unit 11 sends for example a message addressed to one of the light-emitting diode modules 15A, 15B (or a drive circuit thereon), and the addressed light-emitting diode module then responds to this message.

The design of the light-emitting diode modules 15A, 15B in the exemplary embodiment of FIG. 1 is explained in more detail next. In the exemplary embodiment of FIG. 1, the light-emitting diode modules 15A, 15B are of the same design in this case. Thus, the text below describes only the light-emitting diode module 15A, and the description applies in the same manner to the light-emitting diode module 15B. It should be noted that, in other exemplary embodiments, it is also possible for light-emitting diode modules of different design to be used in a system. By way of example, various instances of the light-emitting diode modules described with reference to the figures that follow can be mixed with the light-emitting diode modules 15 shown in FIG. 1 in a system.

The various components of the light-emitting diode module 15A may be arranged for example on a printed circuit board (PCB) or another support. The light-emitting diode module 15A has a first light-emitting diode driver 16 and one or more second light-emitting diode drivers, two second light-emitting diode drivers 17A, 17B of which are depicted. The number of two second light-emitting diode drivers 17A, 17B is intended to be understood only as an example in this case, and it is also possible for only one second light-emitting diode driver or for more than two second light-emitting diode drivers to be provided.

The first light-emitting diode driver 16 communicates with the control unit 11 via the differential bus 19, the first light-emitting diode driver 16 being a slave on the bus 19. As already explained, the control unit 11 in the example of FIG. 1 is therefore the only master on the bus 19 and, as will be explained in more detail later, also prescribes a synchronization.

Each of the light-emitting diode drivers 16, 17A, 17B has an associated multiplicity of light-emitting diodes. As such, the light-emitting diode driver 16 has associated light-emitting diodes 18A, the light-emitting diode driver 17A has associated light-emitting diodes 18B and the light-emitting diode driver 17B has associated light-emitting diodes 18C. The depicted number of light-emitting diodes in FIG. 1 is merely an example in this case. The number of light-emitting diodes and light-emitting diode drivers can also differ between the light-emitting diode modules 15A, 15B.

Each light-emitting diode driver 16, 17A, 17B takes control signals sent by the control unit 11 as a basis for actuating its associated light-emitting diodes selectively, for example all light-emitting diodes together, in groups or single light-emitting diodes. The actuation options in this case are also dependent on a respective application, in particular also on whether specific light effects such as chase effects are meant to be achieved. As such, each of the light-emitting diode drivers 16, 17A, 17B can implement one or more luminous functions, e.g. various configurations of activated and unactivated light-emitting diodes, and/or various brightnesses of light-emitting diodes. Various brightness of light-emitting diodes can be provided in this case for example by means of control of a current flowing through the light-emitting diodes, by means of pulse-width-modulated actuation of the light-emitting diodes (PWM) or by means of pulse-density-modulated actuation of the light-emitting diodes (PDM).

For this purpose, the light-emitting diode driver 16 communicates with the second light-emitting diode drivers 17A, 17B via a single-ended bus no, which has a transmission line (TX) and a reception line (RX) in the depicted example. The transmission line is used to send signals from the first light-emitting diode driver 16 to the second light-emitting diode driver 17A, 17B, and the reception line is used to send signals from the two light-emitting diode drivers 17A, 17B to the first light-emitting diode driver 16. So that the control unit 11 can address the second light-emitting diode drivers 17A, 17B, the first light-emitting diode driver 16 transposes signals from the differential bus 19 onto the single-ended bus no in this case. By way of example, as will be explained in more detail later, the light-emitting diode drivers 16, 17A, 17B can be addressed using respective associated addresses. In that case, for example the first light-emitting diode driver 16 actuates its associated light-emitting diodes 18A on the basis of messages from the control unit 11 that are addressed to the first light-emitting diode driver 16, and transposes messages addressed to one of the second light-emitting diode drivers 17A, 17B onto the single-ended bus no, in order to forward them. Such transposition can be effected for example using voltage transformers in a manner that is known in itself.

The connection from the first light-emitting diode driver 16 to the second light-emitting diode drivers 17A, 17B is what is known as a star-shaped connection in this case, i.e. a line pair of the single-ended bus no branches off to each of the light-emitting diode drivers 17A, 17B. The reception line RX and then the differential bus 19 can be used to send for example diagnosis reports and the like from the light-emitting diode module 15A to the control unit 11, for example if measurements in a light-emitting diode driver indicate failure of one or more light-emitting diodes. The communication via the single-ended bus no in the exemplary embodiment of FIG. 1 may likewise be half-duplex communication, which, at one time, involves communication either from the first light-emitting diode driver 16 to an addressed light-emitting diode driver of the second light-emitting diode drivers 17A, 17B or in the opposite direction, the respective other (unaddressed) light-emitting diode driver 17A, 17B "eavesdropping".

It should be noted that in other exemplary embodiments a differential bus corresponding to the differential bus 19 can be used instead of the single pole bus no. In that case, the first light-emitting diode driver 16 does not need to perform transposition between the differential bus 19 and the single-ended bus no. In yet other exemplary embodiments, a circuit may be provided, instead of the first light-emitting diode driver 16, that performs only transposition from the differential bus 19 onto the single-ended bus no and does not itself actuate light-emitting diodes.

In the exemplary embodiment of FIG. 1, a single-ended bus (the single-ended bus no) is thus used within each light-emitting diode module 15A, whereas a differential bus is used for communication outside (to the control unit 11).

Figure 2:
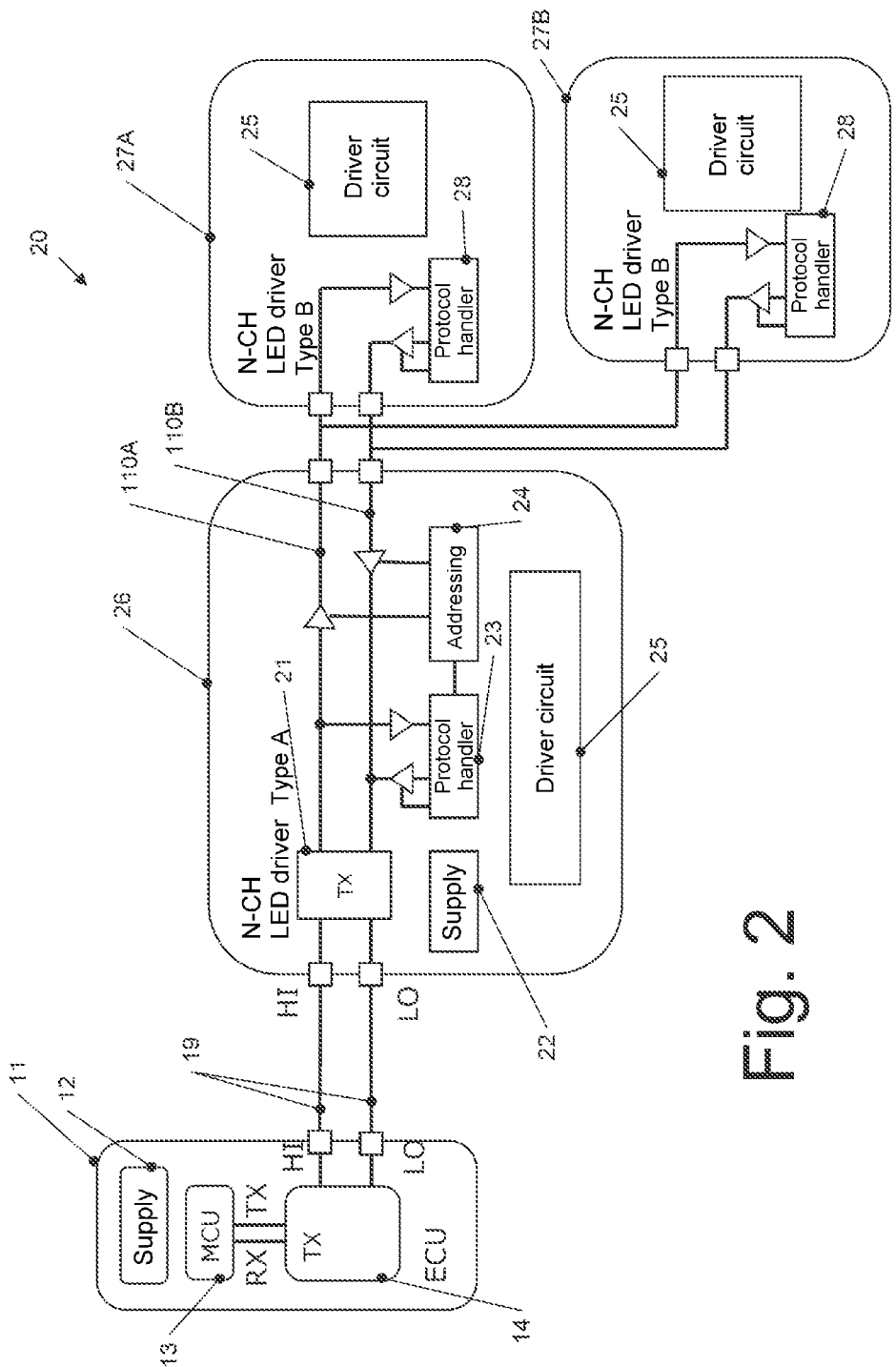
FIG. 2 is a diagram of a system according to a further exemplary embodiment.

An implementation example of the system 10 of FIG. 1 is depicted as system 20 in FIG. 2. FIG. 2 shows the control unit 11 already described, which uses the differential bus 19, likewise already described, to communicate with a first light-emitting diode driver 26. The first light-emitting diode driver 26 in this case is an implementation example of the first light-emitting diode driver 16 of FIG. 1. The first light-emitting diode driver 26 uses the single-ended bus 110 having a transmission line, denoted as 110A in this case, and a reception line, denoted as 110B in this case, to communicate with one or more second light-emitting diode drivers, two light-emitting diode drivers 27A, 27B of which are depicted. The light-emitting diode drivers 27A, 27B are implementation examples of the second light-emitting diode drivers 17A, 17B of FIG. 1. The various components of the light-emitting diode drivers 26, 27A, 27B of FIG. 2 may be provided in a common integrated circuit, and the depiction of the various blocks serves merely to illustrate the different functionalities. However, it is also fundamentally possible for them to be provided in separate integrated circuits. By way of example, the functionalities may be provided by means of digital signal processors (DSP), by means of microcontrollers, embedded microcontrollers or by means of application-specific integrated circuits (ASICs), but they are not restricted thereto.

The first light-emitting diode driver 26 of FIG. 2 comprises a transceiver circuit 21 for communicating via the differential bus 19 and via the single-ended bus no and for transposing the signals between the buses 19, no. As already explained above, the transceiver circuit 21 can correspond, in some exemplary embodiments for communication via the differential bus 19, to a conventional CAN transceiver that, as likewise explained above, can be actuated using another protocol, in particular without arbitration, however. Also, the first light-emitting diode driver 26 has a supply circuit 22 by means of which one or more internal supply voltages (for example voltages for sending signals via the differential bus 19 and via the single-ended bus no) are producible. In addition, the first light-emitting diode driver 26 has a driver circuit 25 by means of which light-emitting diodes associated with the first light-emitting diode driver 26 (for example the light-emitting diodes 18A) can be selectively supplied with current. The driver circuit 25 may be implemented in any conventional manner in this case.

The first light-emitting diode driver 26 has a protocol processing device (protocol handler) 23 and an addressing device 24.

The addressing device 24 records addresses for messages sent by the control device 11 in order to establish whether they are intended for the first light-emitting diode driver 26 or for another light-emitting diode driver 27A, 27B. If the message is intended for the first light-emitting diode driver 26, the protocol processing device 23 analyzes the message and actuates the driver circuit 25 e.g. in accordance with the message in order to actuate the light-emitting diodes. Otherwise, the message is forwarded to the single-ended bus iioA, noB. Depending on the addressing scheme used, it is also possible for the addresses to be converted into an internal format of the respective light-emitting diode module in this case for communication via the differential bus no.

Also, in some exemplary embodiments, the addressing device can be used for initializing addresses. In some exemplary embodiments, all of the light-emitting diode drivers 26, 27A, 27B can initially have the same address. The control device 11 then uses this address to initially address the first connected light-emitting diode driver, in this case the first light-emitting diode driver 26, and allocates it an address. Until this address allocation is effected, the addressing device 24 blocks the forwarding of such address messages as are used for address allocation to the second light-emitting diode drivers 27A, 27B. An address message in this case is generally a message comprising an address to be allocated to a slave, that is to say that is used to allocate addresses within the system. Subsequent address messages are then forwarded to the light-emitting diode drivers 27A, 27B in order to allocate addresses to them. In this case, for example those light-emitting diode drivers 27A, 27B that respond to such an address allocation message first can be provided with the respective address. In the case of other types of bus wiring, which are explained in more detail later, the address allocation can also be effected progressively. In other exemplary embodiments, the light-emitting diode drivers 26, 27A, 27B can also have firmly allocated addresses that are used by the control unit 11.

In yet other exemplary embodiments, internal addresses stipulated at the factory may be stipulated on a light-emitting diode module. As such, the first light-emitting diode driver 26 may have an address 0, the second light-emitting diode driver 27A may have an address 1 and the light-emitting diode driver 27B may have an address 2. During initialization, the control unit 11 then progressively sends address messages having an allocable address to the first light-emitting diode driver 26, and the latter allocates these addresses to the internal addresses in succession. During operation, the addressing device then undertakes the transposition of the "external" addresses allocated by the control unit 11 onto the internal addresses, as already explained briefly above.

Therefore, there are different types of addressing in the exemplary embodiment of FIG. 2.

The second light-emitting diode drivers 27A, 27B are of the same design in the exemplary embodiment of FIG. 2. Thus, only the second light-emitting diode driver 27A is described below. This in turn comprises a driver circuit 25 corresponding to the driver circuit 25 of the light-emitting diode driver 26 by means of which associated light-emitting diodes (for example the light-emitting diodes 18B of FIG. 1) can be selectively supplied with current. Also, the light-emitting diode driver 27A has a protocol processing device 28 that checks incoming messages (on the basis of the address) for whether they are addressed to the light-emitting diode driver 27A, and, if this is the case, actuates for example the driver circuit 25 on the basis of this message. Also, the protocol processing device 28 can respond to a request from the control unit 11 by producing response messages, for example about a diagnosis status of the light-emitting diode driver 27A and/or the associated light-emitting diodes.

The protocol processing device 23 can also produce messages to the control unit 11, for example diagnosis messages or confirmation messages.

In this manner, the differential bus 19 and the single-ended bus no can be used to actuate a multiplicity of light-emitting diodes.

As already mentioned with reference to FIG. 1, in some exemplary embodiments, instead of the first light-emitting diode driver 26, there can be provision for just a circuit that undertakes the transposition from the differential bus 19 onto the single-ended bus 110 and if need be provides addressing functionalities as explained above. In that case, it is for example substantially possible for the driver circuit 25 of the first light-emitting diode driver 26 and the control unit, connected thereto, of associated light-emitting diodes to be omitted.

Systems according to further exemplary embodiments are described below. These systems are variants of the systems described with reference to FIGS. 1 and 2 and differ from these in particular in respect of the type of connections within the light-emitting diode modules, e.g. the connections to the single-ended bus, and possible differences linked thereto in the address allocation.

Otherwise, the exemplary embodiments discussed below with reference to FIGS. 3-8 correspond to the exemplary embodiments of FIGS. 1 and 2, mutually corresponding elements bear the same reference signs and are not explained again and, unless anything different is described below, variants and variations that have been described for the exemplary embodiments of FIGS. 1 and 2 also apply to the exemplary embodiments described below.

Figure 3:
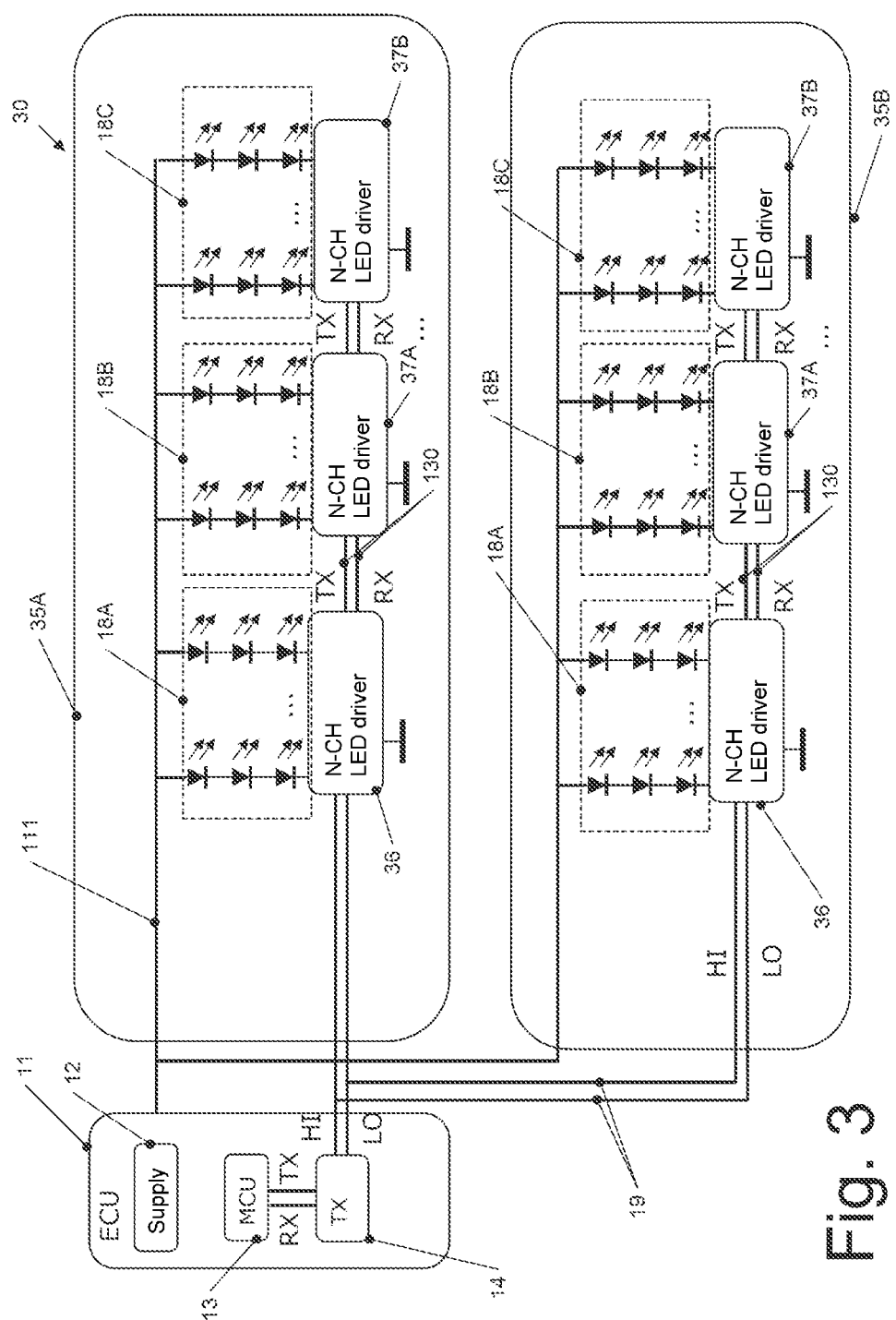
FIG. 3 is a block diagram of a system according to a further exemplary embodiment.

FIG. 3 shows a system 30 according to a further exemplary embodiment. Like the system of FIG. 1, the system of FIG. 3 also has the control unit 11, which communicates with one or more light-emitting diode modules via the differential bus 19 already described, in particular using half-duplex communication as explained above. In the example of FIG. 3, two light-emitting diode modules 35A, 35B are again depicted for the purpose of illustration. The light-emitting diode modules 35A, 35B are of the same design in the exemplary embodiment to FIG. 3, which is why only the light-emitting diode module 35A is described in more detail below. The light-emitting diode module 35A has a first light-emitting diode driver 36 and one or more second light-emitting diode drivers 37A, 37B. Apart from the differences described below, the first light-emitting diode driver 36 corresponds to the first light-emitting diode driver 16 of FIG. 1, and the second light-emitting diode drivers 37A, 37B correspond to the second light-emitting diode drivers 17A, 17B of FIG. 1.

In particular, each of the light-emitting diode drivers 36, 37A, 37B supply respectively associated light-emitting diodes 18A, 18B and 18C with power on the basis of signals that the control unit 11 sends, in order to provide desired lighting.

Also, in similar fashion to the first light-emitting diode driver 16 in the exemplary embodiment of FIG. 1, the first light-emitting diode driver 36 of the exemplary embodiment of FIG. 3 performs transposition between the differential bus 19 and the single-ended bus 130. In contrast to the exemplary embodiment of FIG. 1, the light-emitting diode drivers 37A, 37B are connected not to the first light-emitting diode driver 36 in a star connection as in the case of the single-ended bus no, but rather to the single-ended bus 130 via point-to-point connections in a chain. The differential bus 130 in this case has a transmission line (TX) and a reception line (RX), like the single-ended bus no. The transmission line is used for communication from the first light-emitting diode driver 36 to the second light-emitting diode drivers 37A, 37B, and the reception line is used for communication from the second light-emitting diode drivers 37A, 37B to the first light-emitting diode driver 36. The communication via the single-ended bus 130 can be effected as half-duplex communication in this case, as described for the single-ended bus no, but can also be effected between respective "adjacent" light-emitting diode drivers, that is to say between the light-emitting diode driver 36 and the light-emitting diode driver 37A or between the light-emitting diode driver 37A and the light-emitting diode driver 37B as full-duplex communication too, in which data are transmitted via the transmission line of the bus 130 and the reception line of the bus 130 at the same time.

During operation, the control unit 11 addresses the light-emitting diode drivers 36, 37A, 37B by means of respective associated addresses in order to actuate the respectively associated light-emitting diodes 18A, 18B, 18C. The first light-emitting diode driver 36 in this case processes messages addressed to it itself, and forwards messages addressed to the second light-emitting diode drivers 37A, 37B to the latter via the single-ended bus 130, as described for FIG. 1.

In an initialization phase, progressive address allocation to the light-emitting diode drivers 36, 37A, 37B can be effected by virtue of the control unit sending messages having an allocable address in succession, and these allocable addresses being adopted by the first light-emitting diode driver 36, by the second light-emitting diode driver 37 and by the second light-emitting diode driver 37B in succession. This addressing is explained in more detail below with reference to FIGS. 4 and 8. Other types of address allocation, e.g. the type described with reference to FIGS. 1 and 2, are also possible, however.

Figure 4:
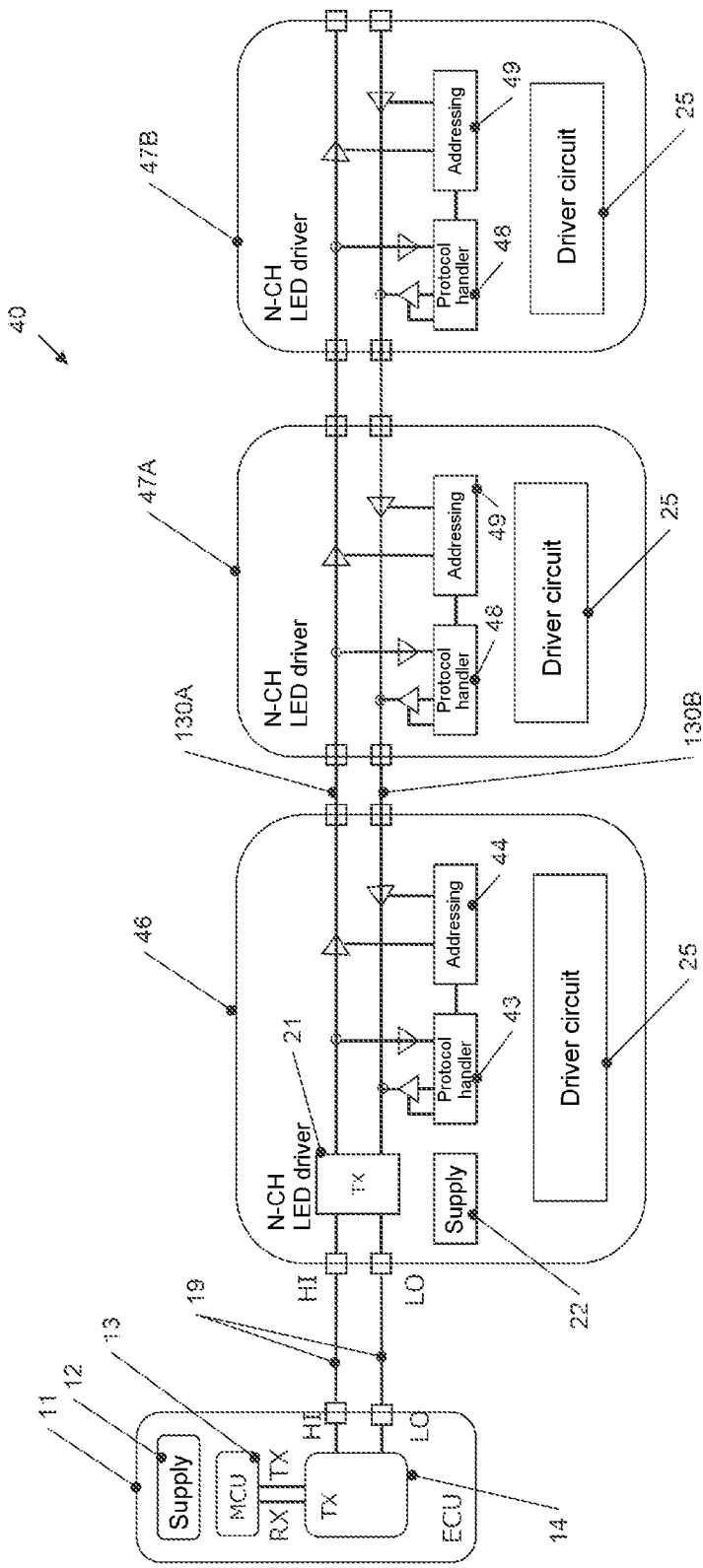
FIG. 4 is a diagram of a system according to a further exemplary embodiment.

FIG. 4 shows a system 40 according to a further exemplary embodiment. The system 40 can be regarded as a specific implementation example for the system 30 of FIG. 3, only components of one light-emitting diode module being depicted in FIG. 4.

The system 40 of FIG. 4 comprises the control unit 11, which uses the differential bus 19 to communicate with a first light-emitting diode driver 46. The first light-emitting diode driver 46 can serve as an implementation example for the first light-emitting diode driver 36 of FIG. 3. The first light-emitting diode driver 46 is connected via the single-ended bus 130 having a transmission line 130A and a reception line 130B to one or more second light-emitting diode drivers, two second light-emitting diode drivers 47A, 47B of which are depicted. The second light-emitting diode drivers 47A, 47B are an implementation example for the second light-emitting diode drivers 37A, 37B of FIG. 3.

Like the first light-emitting diode driver 26 of FIG. 2, the first light-emitting diode driver 46 of FIG. 4 also has the transceiver 21, the supply 22 and the driver circuit 25. Like the second light-emitting diode drivers 27A, 27B of FIG. 2, the second light-emitting diode drivers 47A, 47B also have the driver circuit 25.

Also, the first light-emitting diode driver 46 has a protocol processing device 43, and the second light-emitting diode drivers 47A, 47B have a protocol processing device 48. Like the protocol processing devices 23 and 28 of FIG. 2, the protocol processing devices 43 and 48 of FIG. 4 also take signals addressed to the respective light-emitting diode driver as a basis for actuating the driver circuit 25 and generate signals for an acknowledgement to the control unit 11. In this respect, the light-emitting diode drivers 46, 47A, 47B correspond to the light-emitting diode drivers discussed with reference to FIG. 2.

In addition, the first light-emitting diode driver 46 of FIG. 4 has an addressing device 44, and the second light-emitting diode drivers 47A, 47B each have an addressing device 49. These addressing devices can be used in particular for an initial address allocation by the control unit 11. This address allocation is now discussed with reference to FIG. 4 and also with reference to FIG. 8. In this regard, FIG. 8 shows a flowchart to illustrate the progression for the initial address allocation.

Figure 8:
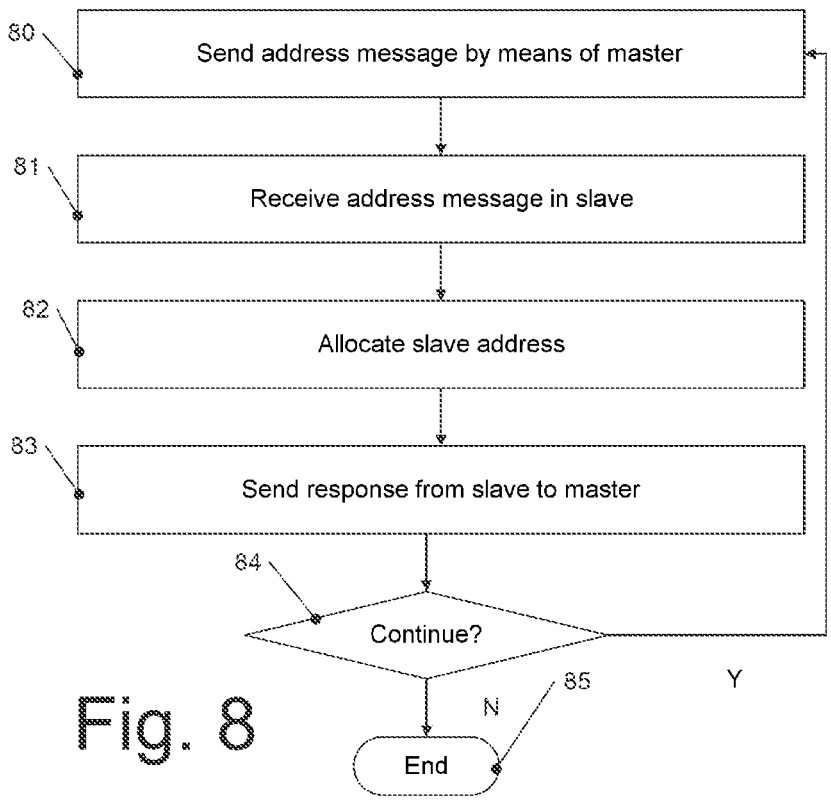
FIG. 8 is a flowchart to illustrate an address allocation in some exemplary embodiments.

At 80 in FIG. 8, a master, the control unit 11 in the case of FIG. 4, sends a first address message having a first allocable address to the light-emitting diode driver. At the start of the initialization, all of the light-emitting diode drivers (46, 47A, 47B) in this case still have no allocated address or have a standard address or all have the same standard address.

This address message is received in a slave at 81. In the example of FIG. 4, the first slave receiving the address message from the control unit 11 is the first light-emitting diode driver 46. Until the first light-emitting diode driver 46 has been allocated an address, the addressing device 44 blocks forwarding of address messages to the subsequent light-emitting diode drivers 47A, 47B in this case. The address message is processed in the first light-emitting diode driver 46 such that the first light-emitting diode driver 46 is allocated the address specified in the address message at 82 in FIG. 8. At 83, the slave, in this case the first light-emitting diode driver 46, sends a response to the master, in the case of FIG. 4 to the control unit 11, indicating that the address allocation has taken place. Also, the addressing device 44 rearranges the forwarding of messages in this case, so that further address messages are no longer processed in the first light-emitting diode driver 46, but rather are forwarded via the single-ended bus 130.

At 84, a check is performed to ascertain whether the method is supposed to be continued in order to allocate further addresses, or is supposed to be terminated. In the exemplary embodiment of FIG. 8, the method is e.g. continued if the response is received at 83, which indicates that the address has still been allocated and there is therefore possibly still a further slave to which an address has been allocated. If no response is provided at 83, on the other hand, this indicates that the address has no longer been allocated, because all the slaves have already been allocated an address. In other exemplary embodiments, the number of slaves can be known to the master, and in this case the method is no longer continued at 84 and terminated at 85 if the known number of address messages has been sent.

If the method is supposed to be continued, the next address message is sent by the master at 80. Said address message is then forwarded by the first light-emitting diode driver 46 and received by the second light-emitting diode driver 47A in the example of FIG. 4. Similarly to the addressing device 44, the addressing device 49 of the second light-emitting diode driver 47A blocks the forwarding of address messages until the second light-emitting diode driver 47A has been allocated an address. The processes described with reference to 81-83 then follow for the second light-emitting diode driver 47A, i.e. it is allocated the address, and it sends a response to the control device 11. Also, the addressing device 49 of the second light-emitting diode driver 47A enables address messages to be forwarded to subsequent light-emitting diode drivers, in this case the second light-emitting diode driver 47B. As such, the method is performed repeatedly until all the light-emitting diode drivers have been sent an address. It should be noted that instead of blocking the forwarding of address messages only, it is possible for the forwarding of all of the messages to be blocked until the respective light-emitting diode driver 46, 47A . . . has been allocated an address.

When all the light-emitting diode drivers 46, 47A, 47B have been allocated an address in this manner, the next address message at 80 is not followed by further address allocation and in particular further response at 83. In this manner, as already explained briefly above, 84 can result in it being detected that no continuation is necessary, since all of the light-emitting diode drivers have been allocated an address. It should be noted that in other exemplary embodiments, an addressing method as depicted in FIG. 8 can also be omitted, and the light-emitting diode drivers, for example during production, can be allocated fixed addresses that are then used.

Figure 5:
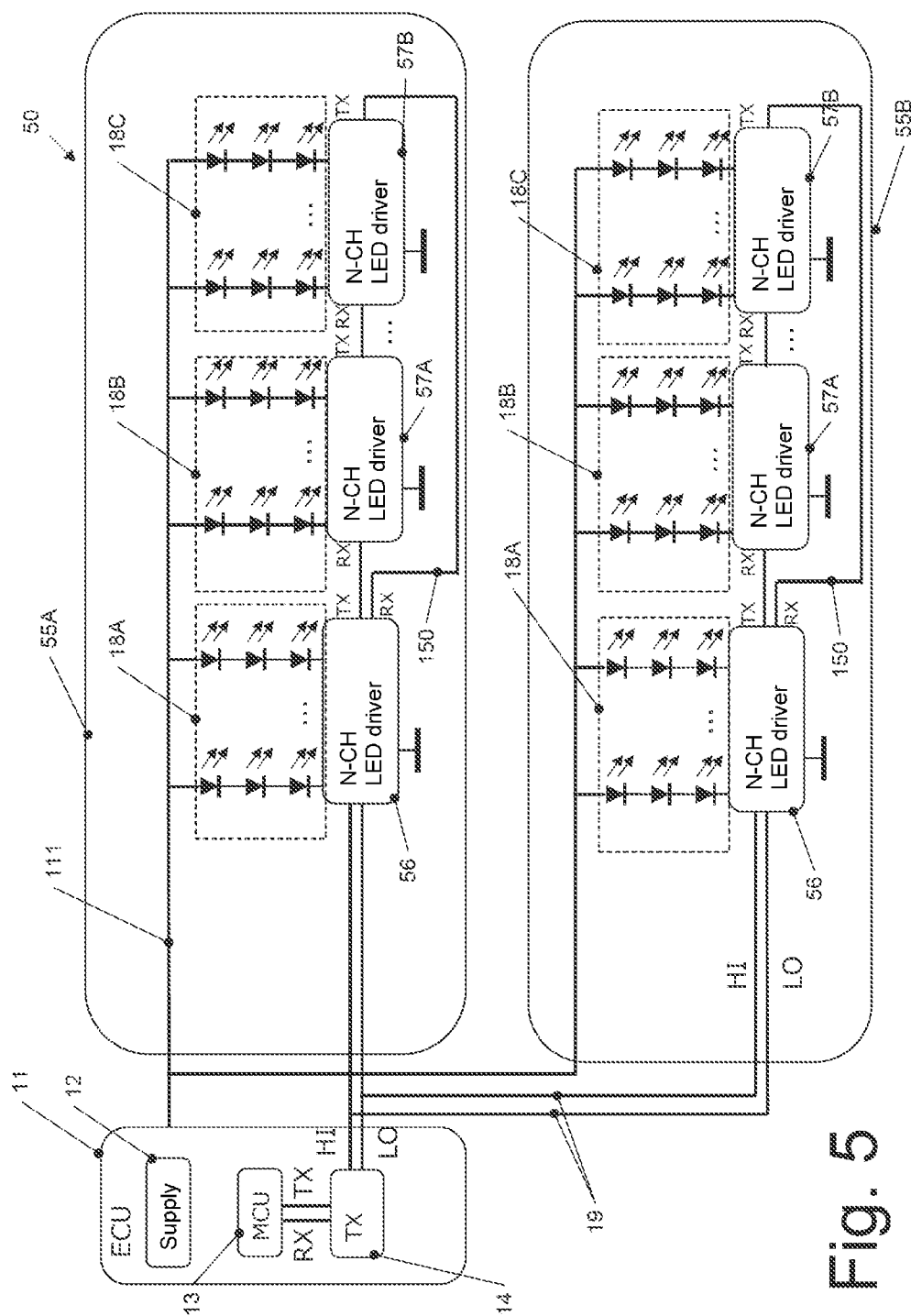
FIG. 5 is a block diagram of a system according to a further exemplary embodiment.

FIG. 5 shows a system 50 according to a further exemplary embodiment. Again, the system 50 depicts a modification of the previously discussed systems, and thus primarily the differences over the systems 10, 20, 30 and 40 discussed above are again explained below.

As in the case of the systems of FIGS. 1 and 3, in the system 50 of FIG. 5, the control unit 11 already described uses the differential bus 19 already described to communicate with one or more light-emitting diode modules, two light-emitting diode modules 55A, 55B of which are depicted explicitly. Each of the light-emitting diode modules 55A, 55B has a first light-emitting diode driver 56 and one or more second light-emitting diode drivers, two light-emitting diode drivers 57A and 57B of which are depicted. While the light-emitting diode modules 55A, 55B in FIG. 5 are depicted having the same design, it is also possible for light-emitting diode modules of different design to be used in other exemplary embodiments.

Each light-emitting diode driver 56, 57A, 57B has associated light-emitting diodes 18A, 18B and 18C, as in the exemplary embodiments of FIGS. 1 and 3. The fundamental functionality of the first light-emitting diode driver 56 and of the second light-emitting diode drivers 57A, 57B are the same apart from the different communication, described below, within the light-emitting diode modules 55A, 55B with the first light-emitting diode drivers and second light-emitting diode drivers described with reference to FIGS. 1-4.

In contrast to the preceding exemplary embodiments, the second light-emitting diode drivers 57A, 57B in the exemplary embodiment of FIG. 5 are connected to the first light-emitting diode driver 56 via a single-ended bus 150 in what is known as a daisy chain configuration, i.e. the bus connects the light-emitting diode drivers 57A, 57B annularly as it were. In this configuration, a single line serving as a transmission line and a reception line at the same time is sufficient for the bus 15o, with data being sent from the light-emitting diode driver 56 to the second light-emitting diode driver 57A, from the second light-emitting diode driver 57A to the second light-emitting diode driver 57B and then from the latter in turn to the first light-emitting diode driver 56.

Figure 6:
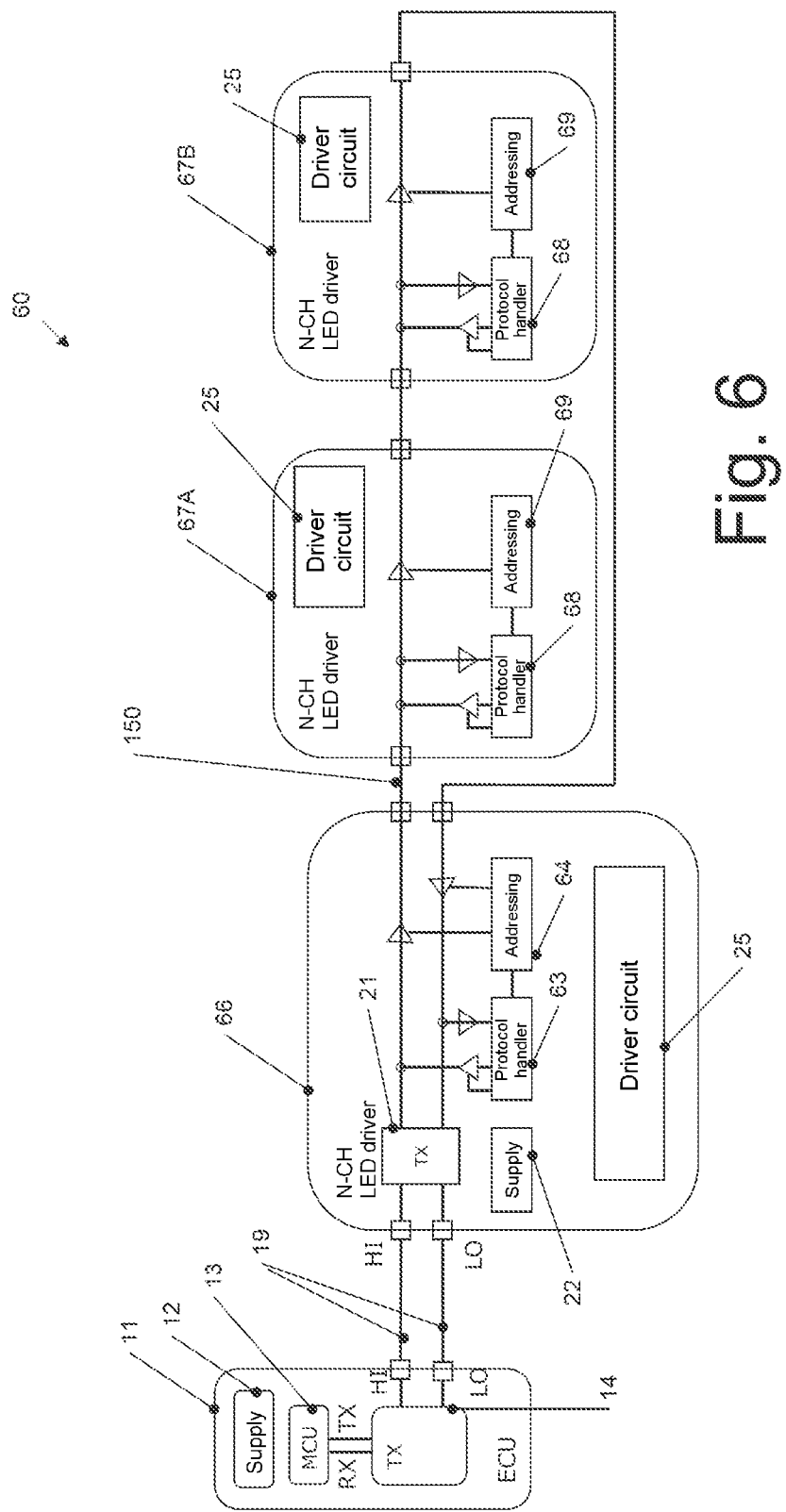
FIG. 6 is a diagram of a system according to a further exemplary embodiment.
Figure 7:
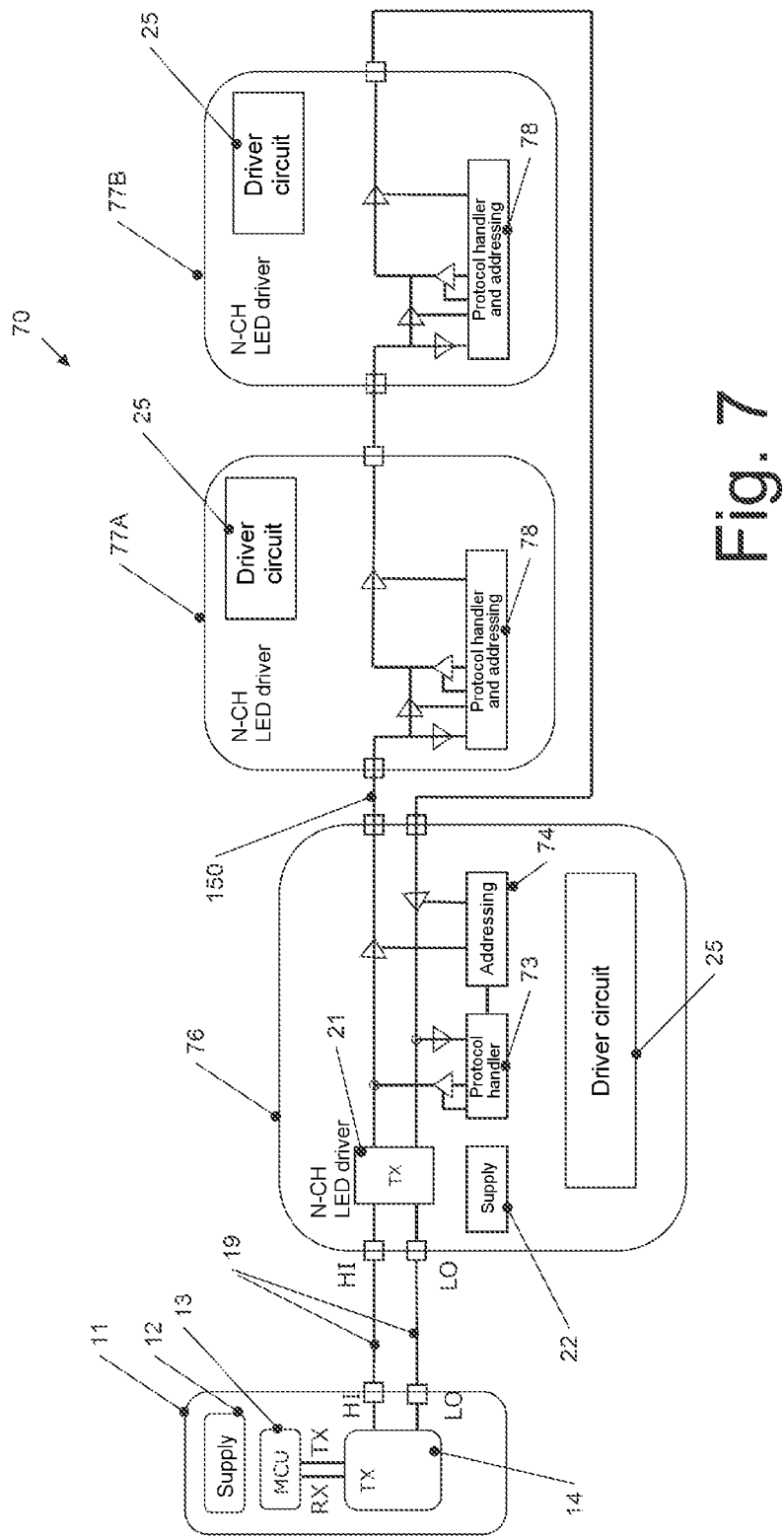
FIG. 7 is a diagram of a system according to a further exemplary embodiment.

Such a daisy chain bus 150 can be operated using half-duplex communication or using full-duplex communication, whereas the communication via the differential bus 19 can be provided as half-duplex communication, as in previous exemplary embodiments. An implementation example for half-duplex communication is shown in FIG. 6, while an implementation example for the full-duplex communication is shown in FIG. 7. Similarly to FIG. 2 for FIG. 1 and to FIG. 4 for FIG. 3, FIGS. 6 and 7 in this case show specific implementation examples for the light-emitting diode drivers of FIG. 5, only light-emitting diode drivers for a light-emitting diode module 55A, 55B being depicted in FIGS. 6 and 7.

In the exemplary embodiment of FIG. 6, a first light-emitting diode driver 66 serves as an implementation example for the first light-emitting diode driver 56 of FIG. 5, and second light-emitting diode drivers 67A, 67B serve as an implementation example for the second light-emitting diode drivers 57A, 57B of FIG. 5.

Components of FIG. 6 such as the transceiver 21, the supply 22 and driver circuits 25 correspond to the components already discussed having the same reference signs.

Also, a protocol processing device 63 and an addressing device 64 of the first light-emitting diode driver 66 and also the one protocol processing device 68 and an addressing device 69 of the second light-emitting diode drivers 67A, 67B correspond, aside from differences resulting from a half-duplex daisy chain connection as in FIG. 6, to the protocol processing devices and the addressing devices described with reference to FIGS. 2 and 4.

In the case of FIG. 6 as already described, half-duplex communication means that the bus 150 can be used either only to send or only to receive. Thus, in practice, messages are progressively "advanced" from light-emitting diode driver to light-emitting diode driver until finally an acknowledgement can be provided to the control unit 11. For an initial address allocation, the method of FIG. 8 can thus be performed in a modified form. In this case too, the respective addressing device 64, 68 blocks the forwarding of address messages as described until the respective light-emitting diode drivers 66, 67A, 67B have been allocated an address. On account of the aforementioned "advancing", an acknowledgement to the control unit 11 is provided in this case only when the last light-emitting diode driver in the daisy chain, in this case the light-emitting diode driver 67B, has also been allocated an address. In that case, in one implementation, the control unit 11 thus sends address messages until it receives an acknowledgement. As soon as the acknowledgement is present, the control unit 11 "knows" that all of the light-emitting diode drivers have been allocated an address, and terminates the method for address allocation accordingly.

Other acknowledgments to the control device 11 are also "pushed" from light-emitting diode driver to light-emitting diode driver until they reach the first light-emitting diode driver 66 and, from there, the control unit 11.

Apart from these differences, the way in which the exemplary embodiment of FIG. 6 works corresponds to the exemplary embodiments described above.

FIG. 7 shows a system 70 as an implementation example for the system 50 of FIG. 5 using full-duplex communication. The exemplary embodiment of FIG. 7 has a first light-emitting diode driver 46 as an implementation example for the first light-emitting diode driver 56 of FIG. 5 and second light-emitting diode drivers 77A, 77B as an implementation example for the second light-emitting diode drivers 57A, 57B of FIG. 5. The first light-emitting diode driver 76 has a protocol processing device 73 and an addressing device 74, which substantially correspond to the protocol processing device 63 and the addressing device 64 of FIG. 6. Each second light-emitting diode driver 77A, 77B has a protocol processing device and addressing device 78, which, aside from the differences described below, correspond to the protocol processing device 68 and the addressing device 69 of FIG. 6.

In particular, as indicated in FIG. 7, it is possible for the protocol processing device and addressing device 78 to be "bypassed" as it were. Such bypassing allows in each case direct sending of an acknowledgement to the first light-emitting diode driver 76 and from there to the control unit 11. Therefore, in that case, for example the light-emitting diode driver 77A can use the "bypassed" light-emitting diode driver 77B to send an acknowledgement ultimately to the control unit 11, this corresponding to full-duplex communication. In this manner, it is substantially possible for the method for address allocation originally described with reference to FIG. 8 to be performed, and direct acknowledgements can also be provided during operation.

Another possible protocol format, which is usable for the exemplary embodiments of FIGS. 1-8 described above, is described next with reference to FIGS. 9 and 10.

Figure 9:
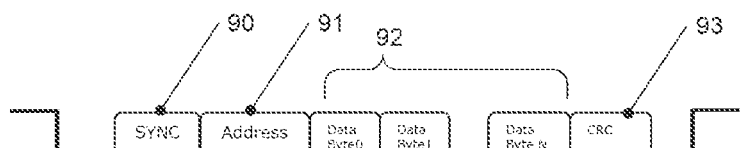
FIGS. 9 and 10 illustrate examples of protocols according to some exemplary embodiments.

FIG. 9 shows an example of a format of a message according to this protocol. The message begins with synchronization information 90. The synchronization information in this case may be a predetermined bit sequence, a predetermined symbol or another predefined signal. This synchronization information 90 synchronizes the light-emitting diode drivers to one another and to the master (for example the control unit 11), so that for example the associated light-emitting diodes such as the light-emitting diodes 18A-18C can be actuated in a synchronous manner. Additionally or alternatively, received clock signals can be synchronized in the light-emitting diode drivers in order to ensure correct sampling of messages from the master.

The synchronization information 90 is then followed at 91 by the address used to address the respective light-emitting diode driver, as has already been explained above. The address 91 is followed by data bytes 92, which can contain for example commands for the respectively addressed light-emitting diode driver to activate or deactivate particular light-emitting diodes. In the case of the address message discussed above, the data bytes can denote the depicted message as an address message. The message of FIG. 9 is completed by means of a checksum, in this case a CRC (Cyclic Redundancy Check) checksum. In other exemplary embodiments, the checksum can also be omitted. The message of FIG. 9 can in particular also be used as a data frame in an accordingly frame-based protocol.

Figure 10:
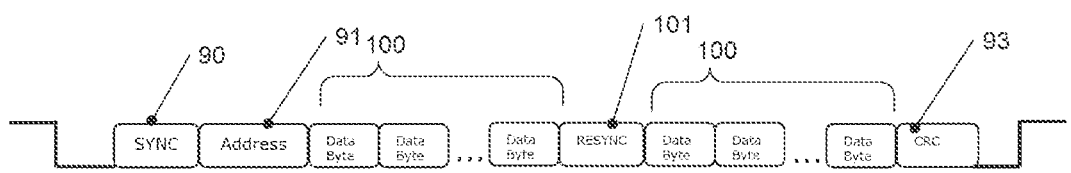

FIG. 10 shows an example of a longer message. Like the example of FIG. 9, the message of FIG. 10 can also be used as a frame in a frame-based protocol. The message of FIG. 10 again begins with the synchronization information 90 followed by the address 91. Since the message of FIG. 10 is longer, the data bytes are divided into two blocks 100, between which synchronization information 101, which can correspond to the synchronization information 90, is again sent. In this manner, it is possible in some exemplary embodiments to prevent the synchronization being lost for long messages. The message of FIG. 10 is completed by the checksum 93, which has already been discussed.

The message formats depicted in FIGS. 9 and 10 are used merely for the purposes of illustration, and other message formats, in particular message formats allowing synchronization and addressing, can also be used.

At least some embodiments are defined by the examples listed below:

Example 1

Light-emitting diode driver, having: a differential first interface, a single-ended second interface, wherein the light-emitting diode driver is configured to use the first interface to communicate according to a bidirectional differential bus communication protocol as a slave, to use the second interface to communicate according to a single-ended bus protocol and to transpose signals between the first interface and the second interface, and to supply one or more light-emitting diodes with electric power on the basis of signals received via the first interface.

Example 2

Light-emitting diode driver according to example 1, wherein the light-emitting diode driver has an address, wherein the light-emitting diode driver is configured to supply the one or more light-emitting diodes with electric power on the basis of signals received via the first interface that comprise the address of the light-emitting diode driver, and to transpose signals received via the first interface that have an address different than the address of the light-emitting diode driver onto the second interface for forwarding.

Example 3

Light-emitting diode driver according to example 2, wherein the light-emitting diode driver is configured so as, in an initialization phase, to receive first address information via the first interface, to receive the address of the light-emitting diode driver on the basis of the first address information and not to forward the first address information via the second interface, and, in the initialization phase, to receive, after the first address information, at least second address information via the first interface and to forward it via the second interface.

Example 4

Light-emitting diode driver according to one of examples 1-3, wherein a physical layer of the bidirectional differential communication protocol corresponds to the physical layer of the Controller Area Network (CAN) communication protocol.

Example 5

Light-emitting diode driver according to one of examples 1-4, wherein the light-emitting diode driver is configured to obtain synchronization information via the first interface and to perform a communication via the first interface and/or via the second interface and/or the supply of the one light-emitting diode or the multiple light-emitting diodes with electric power on the basis of the synchronization information.

Example 6

Light-emitting diode driver, having: at least one single-ended interface, wherein the light-emitting diode driver is configured to use the at least one single-ended interface to communicate according to a single-ended bus protocol, wherein the light-emitting diode driver has an address, wherein the light-emitting diode driver is configured to supply the one or more light-emitting diodes with electric power on the basis of signals received via the at least one interface that comprise the address of the light-emitting diode driver.

Example 7

Light-emitting diode driver according to example 6, wherein the at least one single-ended interface has a first single-ended interface and a second single-ended interface, wherein the light-emitting diode driver is configured so as, in an initialization phase, to receive first address information via the first single-ended interface, to receive the address of the light-emitting diode driver on the basis of the first address information and not to forward the first address information via the second single-ended interface, and, in the initialization phase, to receive, after the first address information, at least second address information via the first single-ended interface and to forward it via the second single-ended interface.

Example 8

Light-emitting diode driver according to one of examples 6 or 7, wherein the light-emitting diode driver is configured to obtain synchronization information via the at least one single-ended interface and to perform a communication via the at least one single-ended interface and/or the supply of the one light-emitting diode or the multiple light-emitting diodes with electric power on the basis of the synchronization information.

Example 9

Light-emitting diode module, having: a first light-emitting diode driver according to one of examples 1-5, a first group of light-emitting diodes, which is associated with the first light-emitting diode driver for supplying electric power, at least one second light-emitting diode driver according to one of examples 6-8, at least one second group of light-emitting diodes, wherein each of the at least one second group of light-emitting diodes is associated with a second light-emitting diode driver of the at least one second light-emitting diode driver for supplying electric power, and a single-ended bus system connected to the second interface of the first light-emitting diode driver and to the respective at least one single-ended interface of the at least one second light-emitting diode driver.

Example 10

Light-emitting diode module, having: a first circuit, having: a differential first interface, a single-ended second interface, wherein the first circuit is configured to use the first interface to communicate according to a bidirectional differential bus communication protocol as a slave, to use the second interface to communicate according to a single-ended bus protocol and to transpose signals between the first interface and the second interface, at least one second light-emitting diode driver according to one of examples 6-8, at least one second group of light-emitting diodes, wherein each of the at least one second group of light-emitting diodes is associated with a second light-emitting diode driver of the at least one second light-emitting diode driver for supplying electric power, and a single-ended bus system connected to the second interface of the first light-emitting diode driver and to the respective at least one single-ended interface of the at least one second light-emitting diode driver.

Example 11

Light-emitting diode module according to example 9 or 10, wherein the first light-emitting diode driver, or the first circuit, and the at least one second light-emitting diode driver are connected in a star configuration via the single-ended bus system.

Example 12

Light-emitting diode module according to example 9 or 10, wherein the first light-emitting diode driver, or the first circuit, and the at least one second light-emitting diode driver are connected in a point-to-point configuration or a daisy chain configuration via the single-ended bus system.

Example 13

Light-emitting diode module according to example 12, wherein the first light-emitting diode driver is designed according to example 3 and the at least one second light-emitting diode driver is designed according to example 7, wherein the light-emitting diode module is configured to use the first interface of the first light-emitting diode driver to progressively obtain address information until all the light-emitting diode drivers of the first light-emitting diode driver and of the at least one second light-emitting diode driver have set their address.

Example 14

System, having: a light-emitting diode module according to one of examples 9-13, and a control unit connected to the first light-emitting diode driver, or the first circuit of the light-emitting diode module, via a differential bus.

Example 15

Light-emitting diode driver, having: at least one differential interface, wherein the light-emitting diode driver is configured to use the at least one differential interface to communicate according to a bidirectional differential bus protocol as a slave, wherein the light-emitting diode driver has an address, wherein the light-emitting diode driver is configured to supply the one or more light-emitting diodes with electric power on the basis of signals received via the at least one interface that comprise the address of the light-emitting diode driver.

Example 16

Light-emitting diode driver according to example 15, wherein the at least one differential interface has a first differential interface and a second differential interface, wherein the light-emitting diode driver is configured so as, in an initialization phase, to receive first address information via the first differential interface, to receive the address of the light-emitting diode driver on the basis of the first address information and not to forward the first address information via the second differential interface, and, in the initialization phase, to receive, after the first address information, at least second address information via the first differential interface and to forward it via the second differential interface.

Example 17

Light-emitting diode driver according to either of examples 15 or 16, wherein the light-emitting diode driver is configured to obtain synchronization information via the at least one differential interface and to perform a communication via the at least one differential interface and/or the supply of the one light-emitting diode or the multiple light-emitting diodes with electric power on the basis of the synchronization information.

Example 18

Light-emitting diode driver according to one of examples 15 to 17, wherein a physical layer of the bidirectional differential communication protocol corresponds to the physical layer of the CAN communication protocol.

Example 19

Light-emitting diode module, having: a multiplicity of light-emitting diode drivers according to one of examples 15-18, a multiplicity of groups of light-emitting diodes, wherein each of the multiplicity of groups of light-emitting diodes is associated with a light-emitting diode driver of the multiplicity of light-emitting diode drivers for supplying electric power, and a differential bus system connected to the respective at least one differential interface of the light-emitting diode drivers.

Example 20

Light-emitting diode module according to example 19, wherein the multiplicity of light-emitting diode drivers is connected in a star configuration via the differential bus system.

Example 21

Light-emitting diode module according to example 19, wherein the multiplicity of light-emitting diode drivers is connected in a point-to-point configuration or a daisy chain configuration via the differential bus system.

Example 22

Light-emitting diode module according to example 21, wherein the multiplicity of light-emitting diode drivers is designed according to example 16, wherein the light-emitting diode module is configured to use the first differential interface of a first light-emitting diode driver of the multiplicity of light-emitting diode drivers to progressively obtain address information until all the light-emitting diode drivers of the multiplicity of light-emitting diode drivers have set their address.

Example 23

System, having: a light-emitting diode module according to one of examples 19-22, and a control unit connected to the first light-emitting diode driver of the light-emitting diode module via a differential bus.

Although specific exemplary embodiments have been illustrated and described in this description, persons with the usual knowledge in the art will recognize that a large number of alternative and/or equivalent implementations can be chosen as a substitution for the specific exemplary embodiments shown and described in this description without departing from the scope of the invention that is shown. It is the intention for this application to cover all adaptations or variations of the specific exemplary embodiments that are discussed here. This invention is thus intended to be restricted only by the claims and the equivalents of the claims.

What is claimed is:

1. A light-emitting diode driver, comprising:
a differential first interface; and
a single-ended second interface,
wherein the light-emitting diode driver is configured to use the first interface to communicate according to a bidirectional differential bus communication protocol as a slave, to use the second interface to communicate according to a single-ended bus protocol and to transpose signals between the first interface and the second interface, and to supply one or more light-emitting diodes with electric power based on signals received via the first interface.

2. The light-emitting diode driver as claimed in claim 1, wherein the light-emitting diode driver has an address, and
wherein the light-emitting diode driver is configured:
to supply the one or more light-emitting diodes with the electric power based on signals received via the first interface that comprise the address of the light-emitting diode driver, and
to transpose signals received via the first interface that have an address different than the address of the light-emitting diode driver onto the second interface for forwarding.

3. The light-emitting diode driver as claimed in claim 2, wherein the light-emitting diode driver is configured:
to receive first address information via the first interface in an initialization phase,
to receive the address of the light-emitting diode driver based on the first address information and not to forward the first address information via the second interface, and
to receive, after the first address information, at least second address information via the first interface and to forward the at least second address information via the second interface in the initialization phase.

4. The light-emitting diode driver as claimed in claim 1, wherein a physical layer of the bidirectional differential communication protocol corresponds to the physical layer of a Controller Area Network (CAN) communication protocol.

5. The light-emitting diode driver as claimed in claim 1, wherein the light-emitting diode driver is configured to obtain synchronization information via the first interface and to perform a communication via the first interface, via the second interface, a supply of the one or more light-emitting diodes, or multiple light-emitting diodes with the electric power based on the synchronization information.

6. A light-emitting diode driver, comprising:
at least one single-ended interface,
wherein the light-emitting diode driver is configured to use the at least one single-ended interface to communicate according to a single-ended bus protocol,
wherein the light-emitting diode driver has an address, and
wherein the light-emitting diode driver is configured to supply one or more light-emitting diodes with electric power on based on signals received via the at least one single-ended interface that comprise the address of the light-emitting diode driver, wherein the light-emitting diode driver is configured to obtain synchronization information via the at least one single-ended interface and to perform a communication via the at least one single-ended interface, or a supply of one light-emitting diode, or multiple light-emitting diodes with the electric power based on the synchronization information.

7. The light-emitting diode driver as claimed in claim 6, wherein the at least one single-ended interface has a first single-ended interface and a second single-ended interface,
wherein the light-emitting diode driver is configured:
to receive first address information via the first single-ended interface in an initialization phase,
to receive the address of the light-emitting diode driver based on the first address information and not to forward the first address information via the second single-ended interface, and
to receive, after the first address information, at least second address information via the first single-ended interface and to forward the at least second address information via the second single-ended interface in the initialization phase.

8. A light-emitting diode module, comprising:
a first group of light-emitting diodes;
a first light-emitting diode driver comprising a differential first interface, and a single-ended second interface, wherein the first light-emitting diode driver is configured to use the first interface to communicate according to a bidirectional differential bus communication protocol as a slave, to use the second interface to communicate according to a single-ended bus protocol and to transpose signals between the first interface and the second interface, and to supply one or more light-emitting diodes of the first group of light-emitting diodes with electric power based on signals received via the first interface, wherein the first group of light-emitting diodes is associated with the first light-emitting diode driver for supplying the electric power;
at least one second group of light-emitting diodes;
at least one second light-emitting diode driver comprising at least one single-ended interface, wherein the second light-emitting diode driver is configured to use the at least one single-ended interface to communicate according to the single-ended bus protocol, wherein the second light-emitting diode driver has an address, and wherein the second light-emitting diode driver is configured to supply one or more light-emitting diodes of the at least one second group of light-emitting diodes with the electric power based on signals received via the at least one single-ended interface that comprise the address of the second light-emitting diode driver, wherein each of the at least one second group of light-emitting diodes is associated with the at least one second light-emitting diode driver for supplying the electric power;
a single-ended bus system connected to the second interface of the first light-emitting diode driver and to the at least one single-ended interface of the at least one second light-emitting diode driver.

9. A light-emitting diode module, having:
a first light-emitting diode driver, comprising:
a differential first interface,
a single-ended second interface,
wherein the first light-emitting diode driver is configured to use the first interface to communicate according to a bidirectional differential bus communication protocol as a slave, to use the second interface to communicate according to a single-ended bus protocol and to transpose signals between the first interface and the second interface;

at least one group of light-emitting diodes;
at least one second light-emitting diode driver comprising at least one single-ended interface, wherein the at least one second light-emitting diode driver is configured to use the at least one single-ended interface to communicate according to the single-ended bus protocol, wherein the at least one second light-emitting diode driver has an address, and wherein the at least one second light-emitting diode driver is configured to supply one or more light-emitting diodes of the at least one group of light-emitting diodes with electric power based on signals received via the at least one single-ended interface that comprise the address of the second light-emitting diode driver, wherein each of the at least one group of light-emitting diodes is associated with a respective second light-emitting diode driver of the at least one second light-emitting diode driver for supplying the electric power; and
a single-ended bus system connected to the second interface of the first light-emitting diode driver and to the at least one single-ended interface of the at least one second light-emitting diode driver.

10. The light-emitting diode module as claimed in claim 9, wherein the first light-emitting diode driver and the at least one second light-emitting diode driver are connected in a star configuration via the single-ended bus system.

11. The light-emitting diode module as claimed in claim 9, wherein the first light-emitting diode driver and the at least one second light-emitting diode driver are connected in a point-to-point configuration or a daisy chain configuration via the single-ended bus system.

12. The light-emitting diode module as claimed in claim 11, wherein
the first light-emitting diode driver is configured:
to receive first address information via the first interface in an initialization phase,
to receive the address of the first light-emitting diode driver based on the first address information and not to forward the first address information via the second interface, and
to receive, after the first address information, at least second address information via the first interface and to forward the at least second address information via the second interface in the initialization phase; and
the at least one second light-emitting diode driver is the at least one single-ended interface has a first single-ended interface and a second single-ended interface, wherein the second light-emitting diode driver is configured:
to receive the first address information via the first single-ended interface in the initialization phase,
to receive the address of the at least one second light-emitting diode driver based on the first address information and not to forward the first address information via the second single-ended interface, and
to receive, after the first address information, at least second address information via the first single-ended interface and to forward the at least second address information via the second single-ended interface in the initialization phase, wherein the light-emitting diode module is configured to use the first interface of the first light-emitting diode driver to progressively obtain address information until all light-emitting diode drivers of the first light-emitting diode driver and of the at least one second light-emitting diode driver have set their address.

13. A system, comprising:
the light-emitting diode module as claimed in claim 9, and
a control unit connected to the first light-emitting diode driver, or the first light-emitting diode driver of the light-emitting diode module, via a differential bus.

14. A light-emitting diode driver, comprising:
at least one differential interface,
wherein the light-emitting diode driver is configured to use the at least one differential interface to communicate according to a bidirectional differential bus communication protocol as a slave,
wherein the light-emitting diode driver has an address, and
wherein the light-emitting diode driver is configured to supply one or more light-emitting diodes with electric power based on signals received via the at least one differential interface that comprise the address of the light-emitting diode driver, wherein the light-emitting diode driver is configured to obtain synchronization information via the at least one differential interface and to perform a communication via the at least one differential interface, a supply of one light-emitting diode, or multiple light-emitting diodes with the electric power based on the synchronization information.

15. The light-emitting diode driver as claimed in claim 14, wherein the at least one differential interface has a first differential interface and a second differential interface, wherein the light-emitting diode driver is configured:
to receive first address information via the first differential interface in an initialization phase,
to receive the address of the light-emitting diode driver based on the first address information and not to forward the first address information via the second differential interface, and
to receive, after the first address information, at least second address information via the first differential interface and to forward it via the second differential interface in the initialization phase.

16. The light-emitting diode driver as claimed in claim 14, wherein a physical layer of the bidirectional differential bus communication protocol corresponds to the physical layer of a Controller Area Network (CAN) communication protocol.

17. A light-emitting diode module, having:
a multiplicity of light-emitting diode drivers as claimed in claim 14,
a multiplicity of groups of light-emitting diodes, wherein each of the multiplicity of groups of light-emitting diodes is associated with a light-emitting diode driver of the multiplicity of light-emitting diode drivers for supplying the electric power, and
a differential bus system connected to the at least one differential interface of the light-emitting diode drivers.

18. The light-emitting diode module as claimed in claim 17, wherein the multiplicity of light-emitting diode drivers is connected in a star configuration via the differential bus system.

19. The light-emitting diode module as claimed in claim 17, wherein the multiplicity of light-emitting diode drivers is connected in a point-to-point configuration or a daisy chain configuration via the differential bus system.

20. The light-emitting diode module as claimed in claim 19,
wherein each of the multiplicity of light-emitting diode drivers has a first differential interface and a second differential interface;
wherein each of the multiplicity of light-emitting diode drivers is configured:

to receive first address information via the first differential interface in an initialization phase, to receive an address of the light-emitting diode driver based on the first address information and not to forward the first address information via the second differential interface, and to receive, after the first address information, at least second address information via the first differential interface and to forward it via the second differential interface in the initialization phase; and wherein the light-emitting diode module is configured to use the first differential interface of a first light-emitting diode driver of the multiplicity of light-emitting diode drivers to progressively obtain address information until all the light-emitting diode drivers of the multiplicity of light-emitting diode drivers have set their address.

21. A system, having:

the light-emitting diode module as claimed in claim 17, and a control unit connected to a first of the multiplicity of light-emitting diode drivers of the light-emitting diode module via a differential bus.

\* \* \* \* \*

UNITED STATES PATENT AND TRADEMARK OFFICE
CERTIFICATE OF CORRECTION

PATENT NO. : 11,006,507 B2
APPLICATION NO. : 16/414934
DATED : May 11, 2021
INVENTOR(S) : Hans-Peter Kreuter It is certified that error appears in the above-identified patent and that said Letters Patent is hereby corrected as shown below:

In the Claims

In Claim 8, Column 20; Lines 52 and 53 insert --and-- after electric power;

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*